(12) United States Patent
Bi et al.

(10) Patent No.: US 12,703,338 B2
(45) Date of Patent: Aug. 11, 2026

(54) FORKLIFT ACTIVE BRAKING CONTROL METHOD AND SYSTEM BASED ON POWER SHIFT TRANSMISSION

(71) Applicant: ANHUI HELI CO., LTD., Anhui (CN)

(72) Inventors: Sheng Bi, Anhui (CN); Donglin Zhang, Anhui (CN); Yingchun Bai, Anhui (CN); Xueyin Shi, Anhui (CN); Xiaodong Zheng, Anhui (CN); Guang Xia, Anhui (CN)

(73) Assignee: ANHUI HELI CO., LTD., Anhui (CN)

( * ) Notice: Subject to any disclaimer, the term of this patent is extended or adjusted under 35 U.S.C. 154(b) by 92 days.

(21) Appl. No.: 18/708,601

(22) PCT Filed: Jun. 15, 2023

(86) PCT No.: PCT/CN2023/100342
§ 371 (c)(1),
(2) Date: May 9, 2024

(87) PCT Pub. No.: WO2024/045768
PCT Pub. Date: Mar. 7, 2024

(65) Prior Publication Data
US 2024/0416881 A1 Dec. 19, 2024

(30) Foreign Application Priority Data
Aug. 31, 2022 (CN) ......................... 202211062030.6

(51) Int. Cl.
*B60T 8/58* (2006.01)
*B60T 8/17* (2006.01)
(Continued)

(52) U.S. Cl.
CPC .............. *B60T 8/58* (2013.01); *B60T 8/1701* (2013.01); *B60T 8/171* (2013.01); *B60T 8/172* (2013.01);
(Continued)

(58) Field of Classification Search
CPC .......... B60T 8/58; B60T 8/1701; B60T 8/171; B60T 8/172; B60T 2220/04;
(Continued)

(56) References Cited

FOREIGN PATENT DOCUMENTS

| CN | 101832387 | 9/2010 |
|---|---|---|
| CN | 102233818 | 11/2011 |

(Continued)

OTHER PUBLICATIONS

English Machine Translation of CN-112124268-A (Year: 2020).*
(Continued)

*Primary Examiner* — Andrew J Cromer
(74) *Attorney, Agent, or Firm* — JCIPRNET

(57) ABSTRACT

A forklift active braking control method based on power shift transmission, comprising the following steps: step 1: obtaining forklift state parameters, if the current state of the forklift is an active braking state, performing step 2; step 2: inputting a current speed signal of the forklift, and obtaining duty ratio parameters that are impact-free and can produce a maximum braking force at the current speed, and outputting proportional solenoid valve control parameters of the transmission according to the obtained duty ratio parameters; step 3: using the proportional solenoid valve control parameters to control the proportional solenoid valve of the transmission to take action, and controlling the forklift power system to output a driving force opposite to a current movement direction of the forklift to drive the forklift to actively brake; step 4: exiting the active braking of the forklift when the forklift speed is detected to be zero.

10 Claims, 2 Drawing Sheets

(51) Int. Cl.

| | |
|---|---|
| ***B60T 8/171*** | (2006.01) |
| ***B60T 8/172*** | (2006.01) |
| ***B66F 9/075*** | (2006.01) |
| ***F16H 59/18*** | (2006.01) |
| ***F16H 59/44*** | (2006.01) |
| ***F16H 59/54*** | (2006.01) |
| ***F16H 59/68*** | (2006.01) |
| ***F16H 61/16*** | (2006.01) |

(52) U.S. Cl.

CPC ......... *B66F 9/07509* (2013.01); *F16H 59/18* (2013.01); *F16H 59/44* (2013.01); *F16H 59/54* (2013.01); *F16H 59/68* (2013.01); *F16H 61/16* (2013.01); *B60T 2220/04* (2013.01); *B60T 2250/00* (2013.01); *B60T 2250/04* (2013.01); *B60T 2260/09* (2013.01)

(58) Field of Classification Search

CPC ...... B66F 9/07509; F16H 59/18; F16H 59/44; F16H 59/54; F16H 59/68; F16H 61/16

See application file for complete search history.

(56) References Cited

FOREIGN PATENT DOCUMENTS

| | | | | |
|---|---|---|---|---|
| CN | 112124268 | | 12/2020 | |
| CN | 112124268 A | * | 12/2020 | .............. B60T 13/68 |
| CN | 113022303 | | 6/2021 | |
| CN | 113320393 | | 8/2021 | |
| CN | 115231477 | | 10/2022 | |
| JP | 2004011779 | | 1/2004 | |
| KR | 19990057766 A | * | 7/1999 | |

OTHER PUBLICATIONS

English Machine Translation of KR-19990057766-A (Year: 1999).*

"International Search Report (Form PCT/ISA/210) of PCT/CN2023/100342," mailed on Sep. 26, 2023, with English translation thereof, pp. 1-5.

"Written Opinion of the International Searching Authority (Form PCT/ISA/237) of PCT/CN2023/100342," mailed on Sep. 26, 2023, pp. 1-4.

* cited by examiner

FORKLIFT ACTIVE BRAKING CONTROL METHOD AND SYSTEM BASED ON POWER SHIFT TRANSMISSION

CROSS-REFERENCE TO RELATED APPLICATION

This application is a 371 of international application of PCT application serial no. PCT/CN2023/100342, and filed on Jun. 15, 2023, which claims priority benefit of Chinese Patent Application No. 202211062030.6, and filed on Aug. 31, 2022. The entirety of each of the above mentioned patent applications is hereby incorporated by reference herein and made a part of this specification.

TECHNICAL FIELD

The invention relates to the field of forklift braking control, and specifically to a forklift active braking control method and system based on power shift transmission.

BACKGROUND

With the application of electric forklifts, many forklift drivers have gradually adapted to the new driving experience of electric forklifts. However, due to the characteristics of the transmission system of counterbalanced forklifts, it is difficult to modify the active safety braking system based on it. Therefore, the driver can only brake the counterbalanced forklift through the traditional method of frequently depressing the brake pedal. In high-intensity and complex working environments such as warehouses, fatigue can lead to safety accidents over time. In addition, traditional counterbalanced forklifts, especially when carrying goods, are relatively heavy and long-term frequent use of the vehicle braking system will cause serious wear and tear of the braking system and insufficient braking force, which can also cause safety accidents.

SUMMARY

The purpose of the present invention is to provide a forklift active braking control method and system based on power shift transmission to solve the problems raised in the above background technology.

To achieve the above objects, the present invention provides the following technical solutions:

A forklift active braking control method based on power shift transmission, comprising the following steps:

step 1: obtaining forklift state parameters, and determining a current state of the forklift according to the forklift state parameters, wherein if the current state of the forklift is an active braking state, performing step 2;

step 2: obtaining forklift speed-duty ratio relationship, inputting a current speed signal of the forklift, and according to the forklift speed-duty ratio relationship, obtaining duty ratio parameters that are impact-free and can produce a maximum braking force at the current speed, and outputting proportional solenoid valve control parameters of the transmission according to the obtained duty ratio parameters;

step 3: using the proportional solenoid valve control parameters generated in step 2 to control the proportional solenoid valve of the transmission to take action, and controlling the forklift power system to output a driving force opposite to a current movement direction of the forklift to drive the forklift to actively brake;

step 4. exiting the active braking of the forklift when the forklift speed is detected to be zero.

In a further embodiment of the present invention, the forklift state parameters comprise brake pedal state, accelerator pedal switch state, forklift speed, and forklift gear position.

In a further embodiment of the present invention, the forklift state comprises active braking state, combined braking state, emergency braking state, normal driving state, wherein the combined braking state are the transmission active braking and a combined braking of the forklift braking system.

In a further embodiment of the present invention, the forklift state determination in step 1 comprises the following steps:

step 1.1: if the accelerator pedal switch is in an on state, entering the normal driving state without any braking;

step 1.2: if the accelerator pedal switch is in an off state, $\theta=0$, entering the clutch active braking state, wherein in the active braking state, only the transmission performs active braking through gear shifting;

step 1.3: if the accelerator pedal switch is in the off state, $\theta\neq0$, entering the combined braking state;

step 1.4: if the accelerator pedal switch is in the off state and $\Delta t_2$ is less than a set threshold, entering the emergency braking state, wherein the clutch active braking system performs emergency braking;

wherein $\theta$ is a pressed angle of the brake pedal;

$\Delta t_2$ is an emergency braking time of the brake pedal, $\Delta t_2$ is the time when $\theta_1$ changes to $\theta_{max}$, $\theta_1$ and $\theta_{max}$ respectively represent an angular position of the brake pedal at a previous moment and an angular position when the brake pedal is pressed to the bottom.

In a further embodiment of the present invention, the vehicle speed-duty ratio in step 2 is obtained by the following method:

step 2.1: setting a normal range of the vehicle speed as $v_1$-$v_y$, and dividing a vehicle speed range evenly into y−1 segments with a total of y points, respectively, as $v_1, v_2, v_3 \ldots v_{y-2}, v_{y-1}, v_y$; a value of the duty ratio is b %, and a unit change difference of adjusting the duty ratio is 1%, an experimental value of the duty ratio is determined as $(b-m_1)$% for the $m_1$-th time; a vehicle speed-duty ratio graph curve determines a number of experimental tests as $y\times m_1$; initializing b %=90%, when the duty ratio experiment starts;

step 2.2: adjusting the vehicle speed to $v_1$, assigning duty ratio value to b %, observing whether the braking deceleration a is within a preset range;

if it is not in the preset range, assigning (b−1) to b, and repeating step 2.2;

if it is observed that the braking deceleration is within the preset range, determining a maximum duty ratio at which the active braking of the power shift transmission can produce a maximum braking force without braking shock at the vehicle speed of $v_1$ as the current value $b_1$ %;

step 2.3: remaining other conditions unchanged, adjusting the vehicle speed to $v_2, v_3 \ldots v_{y-2}, v_{y-1}, v_y$, respectively, and repeating step 2.3 to obtain the maximum duty ratios $b_2$ %, $b_3$ % . . . $b_{y-2}$ %, $b_{y-1}$ %, $b_y$ %, respectively, at which the active braking of the power shift transmission can produce the maximum braking force without braking shock at the vehicle speed of $v_2, v_3 \ldots v_{y-2}, v_{y-1}, v_y$;

step 2.4: after obtaining the maximum duty ratios at which the active braking of the power shift transmission can produce the maximum braking force without braking shock at y different vehicle speeds, respectively, determining y straight line segments using y−1 sets of data $(v_1, b_1)$, $(v_2, b_2)$; $(v_2, b_2)$, $(v_3, b_3)$ . . . $(v_y b_2, b_{y-2})$, $(v_{y-1}, b_{y-1})$; $(v_{y-1}, b_{y-1})$, $(v_y, b_y)$, and obtaining a vehicle speed-duty ratio relationship curve by connecting the y straight line segments.

In a further embodiment of the present invention, before the transmission active braking system takes action in step 3, a forklift gear signal is first detected; if the forklift is in a forward gear, the forklift clutch is controlled to disconnect the forward gear, then the forklift clutch is controlled to engage a reverse gear, and the forklift transmission system is dragged in a reverse direction to slow down the forklift; if the forklift is in the reverse gear, the forklift clutch is controlled to disconnect the reverse gear, then the forklift clutch is controlled to engage the forward gear, and the forklift transmission system is dragged in the reverse direction to slow down the forklift.

In a further embodiment of the present invention, the control method of the transmission active braking system in the combined braking state is the same as the control method of the transmission active braking system in the active braking state.

In a further embodiment of the present invention, when the forklift is in an emergency braking state, a solenoid valve duty ratio of the transmission active braking system should immediately respond to 100%, and the clutch should be engaged and locked.

A forklift active braking control system based on power shift transmission is provided, comprising a vehicle speed sensor, a brake pedal signal sensor, an accelerator pedal switch signal sensor, a vehicle gear signal sensor, a transmission active braking system and a processor;

wherein the transmission active braking system comprises a forward gear proportional solenoid valve and a reverse gear proportional solenoid valve;

wherein an input end of the processor is respectively connected to the vehicle speed sensor, the brake pedal signal sensor, the accelerator pedal switch signal sensor and the vehicle gear signal sensor, and an output end of the processor is respectively connected to the power shift transmission active braking system and a vehicle braking system.

In a further embodiment of the present invention, the vehicle speed sensor is installed on a forklift wheel and is used to collect vehicle speed information.

The brake pedal signal sensor is installed on the brake pedal and is used to collect the driver's operation signal on the brake pedal.

The accelerator pedal switch signal sensor is installed on the accelerator pedal and is used to collect the driver's operation signal on the accelerator pedal.

The vehicle gear signal sensor is installed on a gear operating handle and is used to collect signals that the vehicle is currently in forward gear, reverse gear or neutral gear.

Compared with the prior art, the beneficial effects of the present invention are:

1. The present invention can realize the active safety braking function quickly, conveniently and economically by adding vehicle speed sensors, accelerator pedal switch signal sensor and brake pedal signal sensor to the original forklift structure. The active safe braking function is realized through active braking of the clutch, which can reduce the wear and tear of the original braking system of the vehicle and extend its service life. The vehicle clutch adopts a wet clutch, which has excellent heat dissipation effect, long service life and easy replacement.

2. The combined braking of the clutch active braking-vehicle braking system proposed by the present invention can provide greater braking force and ensure driving safety in emergencies.

3. The active safety braking control method proposed by the present invention can realize the driver's "electric forklift" driving experience, greatly reduce the driver's fatigue during driving work, and improve driving safety. And when an emergency occurs, it can independently judge and perform emergency braking, further avoiding the occurrence of safety accidents.

DESCRIPTION OF EMBODIMENTS

The technical solutions in the embodiments of the present invention will be clearly and completely described below with reference to the accompanying drawings in the embodiments of the present invention. Obviously, the described embodiments are only some of the embodiments of the present invention, rather than all the embodiments. Based on the embodiments of the present invention, all other embodiments obtained by those of ordinary skill in the art without creative efforts fall within the scope of protection of the present invention.

Figure 1:
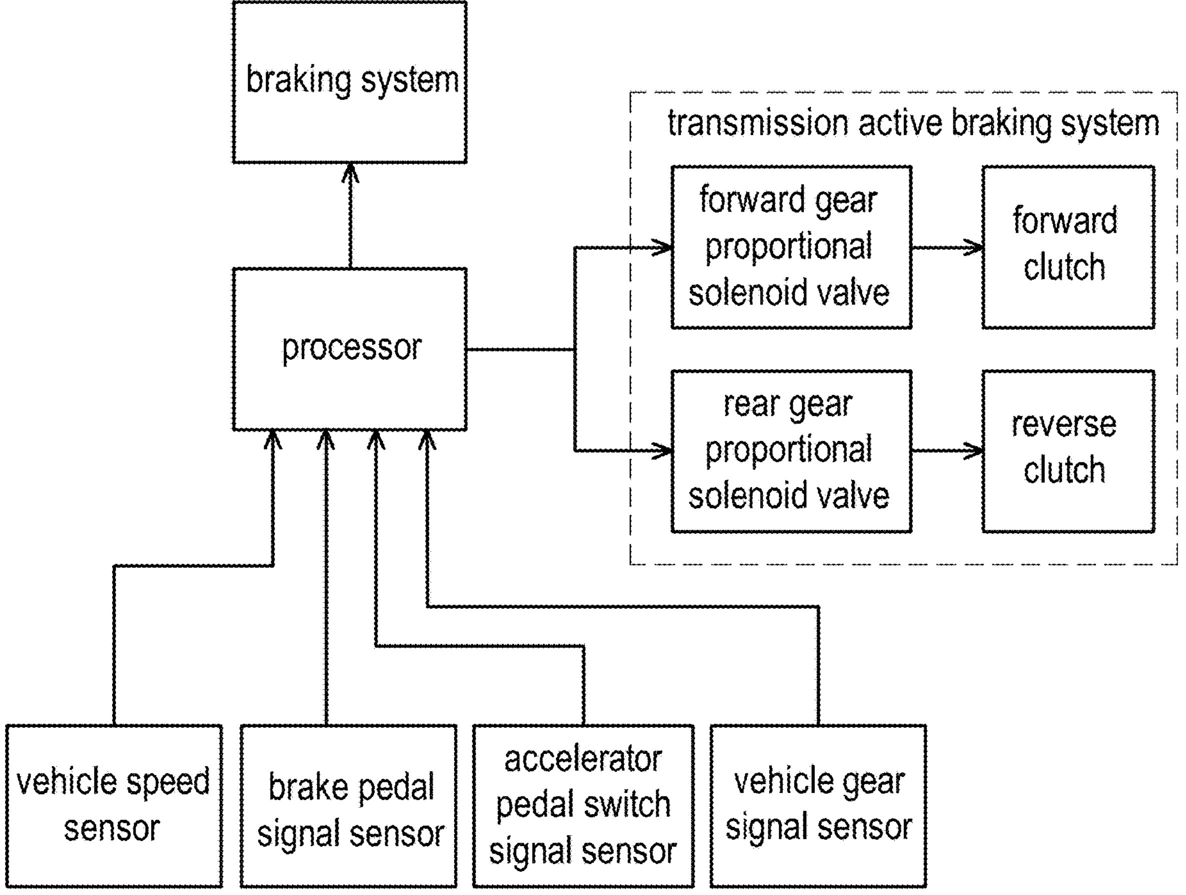
FIG. 1 is a schematic structural diagram of the forklift control system of this application.

Referring to FIG. 1, in an embodiment of the present invention, a forklift active braking system based on power shift transmission comprises a vehicle speed sensor, a brake pedal signal sensor, an accelerator pedal switch signal sensor, a vehicle gear signal sensor, a power shift transmission active braking system and a processor.

The vehicle speed sensor is installed on a forklift wheel and is used to collect vehicle speed information.

The brake pedal signal sensor is installed on the brake pedal and is used to collect the driver's operation signal on the brake pedal.

The accelerator pedal switch signal sensor is installed on the accelerator pedal and is used to collect the driver's operation signal on the accelerator pedal.

The vehicle gear signal sensor is installed on a gear operating handle and is used to collect signals that the vehicle is currently in forward gear, reverse gear or neutral gear.

The power shift transmission active braking system consists of a forward gear proportional solenoid valve, a forward clutch, a reverse gear proportional solenoid valve, and a reverse clutch.

An input end of the processor is respectively connected to the vehicle speed sensor, brake pedal signal sensor, accelerator pedal switch signal sensor, and vehicle gear signal. An output end of the processor is respectively connected to the power shift transmission active braking system and a vehicle braking system.

A forklift active braking control method based on power shift transmission is applied to a forklift equipped with a forklift active braking system. The control method is carried out as follows:

step 1: obtaining the forklift state parameters, wherein the forklift state parameters comprise brake pedal state, accelerator pedal switch state, forklift speed, and forklift gear position, a current state of the forklift is determined according to the forklift state parameters, wherein the forklift state comprises active braking state, combined braking state, emergency braking state, normal driving state, and the combined braking state are the transmission active braking and a combined braking of the forklift braking system, wherein the forklift state determination comprises the following steps:

step 1.1: if the accelerator pedal switch is in an on state, entering the normal driving state without any braking;

step 1.2: if the accelerator pedal switch is in an off state, θ=θ, entering the clutch active braking state, wherein in the active braking state, only the transmission performs active braking through gear shifting;

step 1.3: if the accelerator pedal switch is in the off state, θ≠θ, entering the combined braking state, wherein the control method of the transmission active braking system in the combined braking state is the same as the control method of the transmission active braking system in the active braking state;

step 1.4: if the accelerator pedal switch is in an off state and $\Delta t_2$ is less than a set threshold, entering the emergency braking state, wherein the clutch active braking system performs emergency braking; when the forklift is in an emergency braking state, a solenoid valve duty ratio of the transmission active braking system should immediately respond to 100%, and the clutch should be engaged and locked;

wherein θ is a pressed angle of the brake pedal;

$\Delta t_2$ is an emergency braking time of the brake pedal, $\Delta t_2$ is the time when $\theta_1$ changes to $\theta_{max}$, $\theta_1$ and $\theta_{max}$ respectively represent an angular position of the brake pedal at a previous moment and an angular position when the brake pedal is pressed to the bottom;

if the current state of the forklift is the active braking state, performing step 2;

step 2. obtaining the forklift speed-duty ratio relationship, wherein the vehicle speed-duty ratio is obtained by the following method:

step 2.1: setting a normal range of the vehicle speed as $v_1$-$v_y$, and dividing a vehicle speed range evenly into y−1 segments with a total of y points, respectively, as $v_1, v_2, v_3 \ldots v_{y-2}, v_{y-1}, v_y$; a value of the duty ratio is b %, and a unit change difference of adjusting the duty ratio is 1%, an experimental value of the duty ratio is determined as $(b-m_1)$% for the $m_1$-th time; a vehicle speed-duty ratio graph curve determines a number of experimental tests as $y \times m_1$; initializing b %=90%, when the duty ratio experiment starts;

step 2.2: adjusting the vehicle speed to $v_1$, assigning duty ratio value to b %, observing whether the braking deceleration a is within a preset range;

if it is not in the preset range, assigning (b−1) to b, and repeating step 2.2;

if it is observed that the braking deceleration is within the preset range, determining a maximum duty ratio at which the active braking of the power shift transmission can produce a maximum braking force without braking shock at the vehicle speed of $v_1$ as the current value $b_1$ %;

step 2.3: remaining other conditions unchanged, adjusting the vehicle speed to $v_2, v_3 \ldots v_{y-2}, v_{y-1}, v_y$, respectively, and repeating step 2.3 to obtain the maximum duty ratios $b_2$ %, $b_3$ % . . . $b_{y-2}$ %, $b_{y-1}$ %, $b_y$ %, respectively, at which the active braking of the power shift transmission can produce the maximum braking force without braking shock at the vehicle speed of $v_2, v_3 \ldots v_{y-2}, v_{y-1}, v_y$;

step 2.4: after obtaining the maximum duty ratios at which the active braking of the power shift transmission can produce the maximum braking force without braking shock at y different vehicle speeds, respectively, determining y straight line segments using y−1 sets of data $(v_1, b_1), (v_2, b_2); (v_2, b_2), (v_3, b_3) \ldots (v_2, b_{y-2}), (v_1, b_{y-1}); (v_{y-1}, b_{y-1}), (v_y, b_y)$, and obtaining a vehicle speed-duty ratio relationship curve by connecting the y straight line segments;

inputting a current speed signal of the forklift, and according to the forklift speed-duty ratio relationship, obtaining duty ratio parameters that are impact-free and can produce a maximum braking force at the current speed, and outputting proportional solenoid valve control parameters of the transmission according to the obtained duty ratio parameters;

step 3: using the proportional solenoid valve control parameters generated in step 2 to control the proportional solenoid valve of the transmission to take action, and controlling the forklift power system to output a driving force opposite to a current movement direction of the forklift to drive the forklift to actively brake, detecting a forklift gear position signal before the system takes action; if the forklift is in a forward gear, the forklift clutch is controlled to disconnect the forward gear, then the forklift clutch is controlled to engage a reverse gear, and the forklift transmission system is dragged in a reverse direction to slow down the forklift; if the forklift is in the reverse gear, the forklift clutch is controlled to disconnect the reverse gear, then the forklift clutch is controlled to engage the forward gear, and the forklift transmission system is dragged in the reverse direction to slow down the forklift;

step 4: exiting the active braking of the forklift when the forklift speed is detected to be zero.

Embodiment 1

Figure 2:
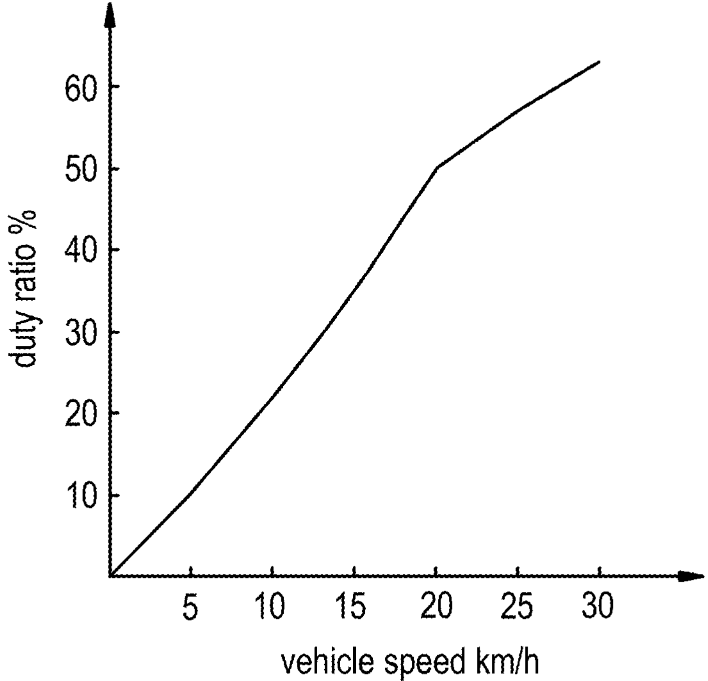
FIG. 2 is a schematic diagram of vehicle speed-duty ratio in embodiment 1 of the present application.

This embodiment is used on a certain type of 3-ton counterbalanced forklift. The maximum allowable speed of the forklift is about 30 km/h. The set speed range is 6, and the emergency braking time $\Delta t_2$=0.2 s;

Assuming that a power shift forklift equipped with this active braking system is travelling at a speed of 20 km/h, the experimental vehicle speed-duty ratio diagram is as shown in FIG. 2. At this time, the driver releases the accelerator pedal, and the accelerator pedal switch signal sensor detects that the accelerator pedal is not depressed, and the brake pedal is not depressed, so θ=0, the clutch active braking state is entered. Through the vehicle speed-duty ratio diagram written in the program, the controller obtains the maximum duty ratio of 45% at which the active braking of the power shift transmission can produce the maximum braking force without braking shock at the vehicle speed of 20 km/h. The solenoid valve duty ratio is adjusted to 45%. At this time, the vehicle has begun to brake and the braking deceleration is within a reasonable range, and the vehicle can achieve a smooth active braking. At this time, the driver depresses the brake pedal, θ=20, and the vehicle braking system intervenes. The power shift transmission active braking system and the vehicle braking system can work at the same time and decelerate to zero at the appropriate place according to the driver's intention. Finally, the vehicle is allowed to travel at a speed of 15 km/h. The driver quickly depresses the brake pedal to simulate emergency driving conditions. It is detected that $\Delta t_2=0.1$ s<0.2 s, so it enters the emergency braking state and the clutch active braking system performs emergency braking. The solenoid valve duty ratio of the power shift transmission active braking system should respond to 100%. The clutch engages and locks quickly. The vehicle braked and stopped safely within a distance of 3 m. This effectively shortens the emergency braking distance and ensures driving safety.

It is obvious to those skilled in the art that the present invention is not limited to the details of the above-described exemplary embodiments, and the present invention can be implemented in other specific embodiments without departing from the spirit or essential characteristics of the present invention. Those skilled in the art should take the description as a whole, and the technical solutions in each embodiment can also be appropriately combined to form other embodiments that can be understood by those skilled in the art.

What is claimed is:

1. A forklift active braking control method based on power shift transmission, wherein the power shift transmission comprises a forward gear clutch controlled by a forward gear proportional solenoid valve and a reverse gear clutch controlled by a reverse gear proportional solenoid valve, comprising the following steps:

- step 1: obtaining forklift state parameters, and determining a current state of a forklift according to the forklift state parameters, wherein if the current state of the forklift is an active braking state, performing step 2;
- step 2: obtaining forklift speed-duty ratio relationship, inputting a current speed signal of the forklift, and according to the forklift speed-duty ratio relationship, obtaining duty ratio parameters that cause a braking deceleration of the forklift to be within a preset range and can produce a maximum braking force at the current speed, and outputting proportional solenoid valve control parameters of the forward gear proportional solenoid valve or the reverse gear proportional solenoid valve of the power shift transmission according to the obtained duty ratio parameters;
- step 3: using the proportional solenoid valve control parameters generated in step 2 to control the forward gear proportional solenoid valve or the reverse gear proportional solenoid valve of the power shift transmission to take action, to engage the reverse gear clutch when the forklift is in a forward gear, or to engage the forward gear clutch when the forklift is in a reverse gear, thereby controlling a forklift power system to output a driving force opposite to a current movement direction of the forklift to drive the forklift to actively brake; and
- step 4: exiting active braking of the forklift when a forklift speed is detected to be zero.

2. The forklift active braking control method based on power shift transmission according to claim 1, wherein the forklift state parameters comprise brake pedal state, accelerator pedal switch state, forklift speed, and forklift gear position.

3. The forklift active braking control method based on power shift transmission according to claim 2, wherein the forklift state comprises active braking state, combined braking state, emergency braking state, and normal driving state, wherein the combined braking state is a transmission active braking and a combined braking of the forklift braking system.

4. The forklift active braking control method based on power shift transmission according to claim 3, wherein the forklift state determination in step 1 comprises the following steps:

- step 1.1: if the accelerator pedal switch is in an on state, entering the normal driving state without any braking;
- step 1.2: if the accelerator pedal switch is in an off state, $\theta=0$, entering clutch active braking state, wherein in the active braking state, only the transmission performs active braking through gear shifting;
- step 1.3: if the accelerator pedal switch is in the off state, $\theta\neq0$, entering the combined braking state;
- step 1.4: if the accelerator pedal switch is in the off state and $\Delta t_2$ is less than a set threshold, entering the emergency braking state, wherein the power shift transmission performs emergency braking;
- wherein $\theta$ is a pressed angle of the brake pedal;
- $\Delta t_2$ is an emergency braking time of the brake pedal, $\Delta t_2$ is a time when $\theta_1$ changes to $\theta_{max}$, $\theta_1$ and $\theta_{max}$ respectively represent an angular position of the brake pedal at a previous moment and an angular position when the brake pedal is pressed to a fully depressed position.

5. The forklift active braking control method based on power shift transmission according to claim 1, wherein the forklift speed-duty ratio relationship in step 2 is obtained by the following method:

- step 2.1: setting a normal range of the forklift speed as $v_1 \sim v_y$, and dividing a forklift speed range evenly into y−1 segments with a total of y points, respectively, as $v_1, v_2, v_3 \ldots v_{y-2}, v_{y-1}, v_y$; a value of the duty ratio is b %, and a unit change difference of adjusting the duty ratio is 1%, an experimental value of the duty ratio is determined as $(b-m_1)$ % for the $m_1$-th time; a forklift speed-duty ratio graph curve determines a number of experimental tests as $y \times m_1$; initializing b %=90%, when the duty ratio experiment starts;
- step 2.2: adjusting the forklift speed to $v_1$, assigning duty ratio value to b %, observing whether the braking deceleration a is within a preset range;
- if it is not in the preset range, assigning (b−1) to b, and repeating step 2.2;
- if it is observed that the braking deceleration is within the preset range, determining a maximum duty ratio at which the active braking of the power shift transmission can produce a maximum braking force without braking shock at the forklift speed of $v_1$ as the current value $b_1$ %;
- step 2.3: remaining other conditions unchanged, adjusting the forklift speed to $v_2, v_3 \ldots v_{y-2}, v_{y-1}, v_y$, respectively, and repeating step 2.3 to obtain the maximum duty ratios $b_2$ %, $b_3$ % . . . $b_{y-2}$ %, $b_{y-1}$ %, $b_y$ %, respectively, at which the active braking of the power shift transmission can produce the maximum braking force without braking shock at the forklift speed of $v_2, v_3 \ldots v_{y-2}, v_{y-1}, v_y$;
- step 2.4: after obtaining the maximum duty ratios at which the active braking of the power shift transmission can produce the maximum braking force without braking shock at y different forklift speeds, respectively, determining y straight line segments using y−1 sets of data $(v_1, b_1), (v_2, b_2); (v_2, b_2), (v_3, b_3) \ldots (v_{y-2}, b_{y-2}), (v_{y-1}, b_{y-1}); (v_{y-1}, b_{y-1}), (v_y, b_y)$, and obtaining a forklift speed-duty ratio relationship curve by connecting the y straight line segments.

6. The forklift active braking control method based on power shift transmission according to claim 1, wherein a forklift gear position signal is detected; and if the forklift is in a forward gear, the forward gear clutch is controlled to disconnect, and then the reverse gear clutch is controlled to engage, whereby the forklift transmission system is dragged in a reverse direction to slow down the forklift;

if the forklift is in the reverse gear, the reverse gear clutch is controlled to disconnect, and then the forward gear clutch is controlled to engage, whereby the forklift transmission system is dragged in the reverse direction to slow down the forklift.

7. The forklift active braking control method based on power shift transmission according to claim 3, wherein the control method of the power shift transmission in the combined braking state is the same as the control method of the power shift transmission in the active braking state.

8. The forklift active braking control method based on power shift transmission according to claim 3, wherein when the forklift is in an emergency braking state, a solenoid valve duty ratio of the power shift transmission should immediately respond to 100%, and the forward gear clutch or the reverse gear clutch should be engaged and locked.

9. A control system using the forklift active braking control method based on power shift transmission according to claim 1, the control system comprises:

a vehicle speed sensor, a brake pedal signal sensor, an accelerator pedal switch signal sensor, a vehicle gear signal sensor, a power shift transmission and a processor;

wherein the power shift transmission comprises a forward gear proportional solenoid valve, a reverse gear proportional solenoid valve, a forward gear clutch, and a reverse gear clutch;

wherein an input end of the processor is respectively connected to the vehicle speed sensor, the brake pedal signal sensor, the accelerator pedal switch signal sensor and the vehicle gear signal sensor, and an output end of the processor is respectively connected to the power shift transmission and a vehicle braking system.

10. The control system according to claim 9, wherein the vehicle speed sensor is installed at a forklift wheel and is used to collect vehicle speed information;

wherein the brake pedal signal sensor is installed on the brake pedal and is used to collect a driver's operation signal on the brake pedal;

wherein the accelerator pedal switch signal sensor is installed on the accelerator pedal and is used to collect a driver's operation signal on the accelerator pedal;

wherein the vehicle gear signal sensor is installed on a gear operating handle and is used to collect signals that the forklift is currently in forward gear, reverse gear or neutral gear.

* * * * *